United States Patent
Benisch et al.

(10) Patent No.: US 11,269,341 B2
(45) Date of Patent: Mar. 8, 2022

(54) SYSTEMS AND METHODS FOR AUTOMATED TRAJECTORY PREDICTION

(71) Applicant: Woven Planet North America, Inc., Los Altos, CA (US)

(72) Inventors: Michael Jared Benisch, Menlo Park, CA (US); John Houston, San Francisco, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 213 days.

(21) Appl. No.: 16/456,472

(22) Filed: Jun. 28, 2019

(65) Prior Publication Data

US 2020/0409378 A1 Dec. 31, 2020

(51) Int. Cl.
*G05D 1/02* (2020.01)
*G05D 1/00* (2006.01)

(52) U.S. Cl.
CPC ......... *G05D 1/0221* (2013.01); *G05D 1/0088* (2013.01); *G05D 1/0214* (2013.01); *G05D 2201/0213* (2013.01)

(58) Field of Classification Search
CPC .......... G06N 3/063; G06N 3/08; G06N 3/049; G06N 3/0635; G11C 11/54; G11C 13/0004; G11C 13/0007; H01L 49/02; H01L 45/065; H01L 45/1226; H01L 45/146
See application file for complete search history.

(56) References Cited

U.S. PATENT DOCUMENTS

| | | | |
|---|---|---|---|
| 2019/0354111 A1* | 11/2019 | Cheng | G05D 1/0011 |
| 2019/0384303 A1* | 12/2019 | Muller | G06K 9/00791 |
| 2020/0082817 A1* | 3/2020 | Narayanan | G06N 3/0454 |
| 2020/0211394 A1* | 7/2020 | King | G05D 1/0289 |

* cited by examiner

*Primary Examiner* — Rodney A Butler
(74) *Attorney, Agent, or Firm* — Christopher G. Darrow; Darrow Mustafa PC

(57) ABSTRACT

Systems, methods, and non-transitory computer-readable media can determine a raster representative of a surrounding environment of a vehicle, wherein the raster depicts one or more objects in the surrounding environment of the vehicle. A plurality of trajectory proposals are determined for a first object of the one or more objects. For each trajectory proposal of the plurality of trajectory proposals, a score indicative of a likelihood that the first object will take a trajectory consistent with the trajectory proposal, and an offset for modifying the trajectory proposal are generated. A predicted trajectory is determined for the first object based on the scores and the offsets for the plurality of trajectory proposals.

20 Claims, 9 Drawing Sheets

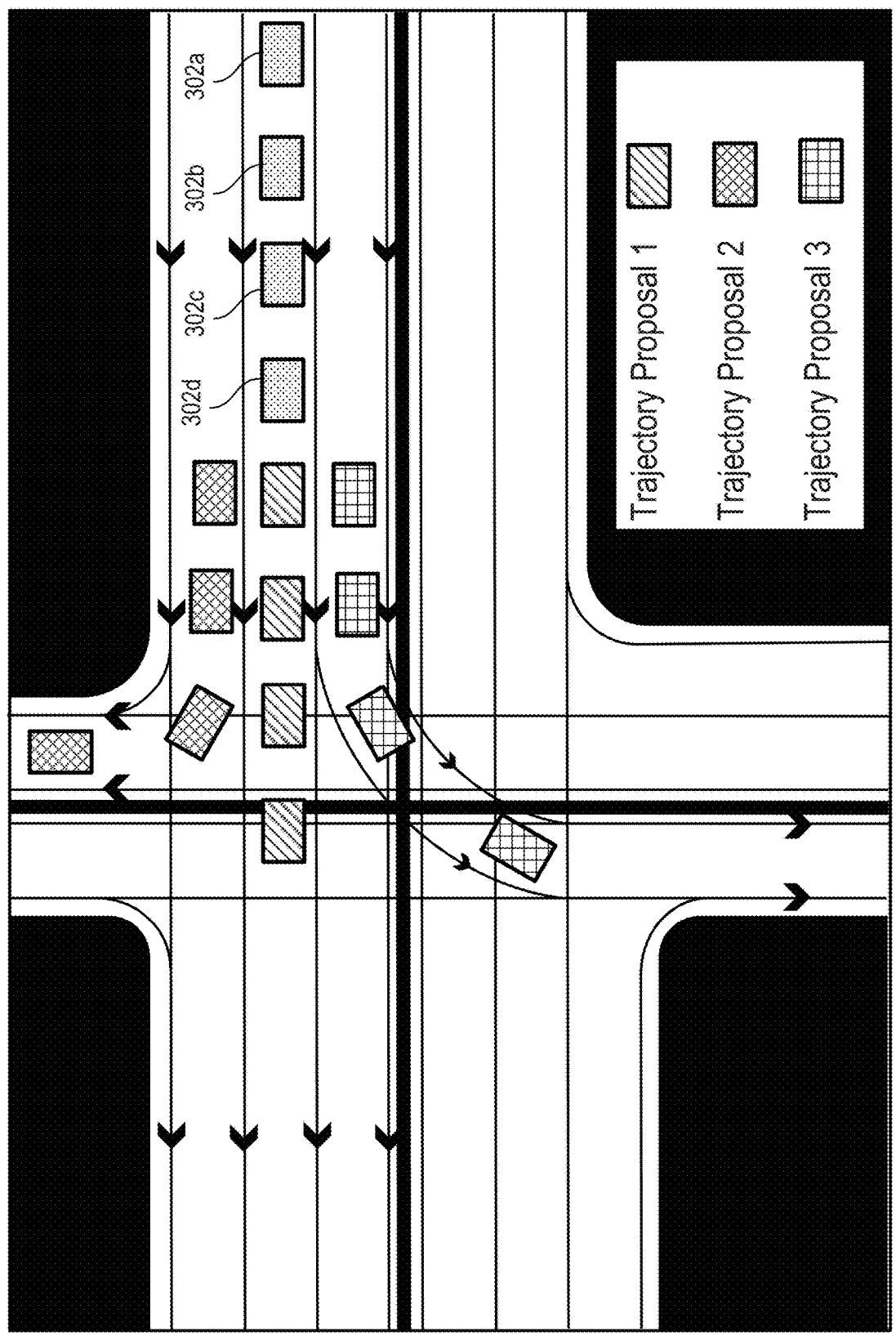

SYSTEMS AND METHODS FOR AUTOMATED TRAJECTORY PREDICTION

FIELD OF THE INVENTION

The present technology relates to vehicle systems and navigation systems. More particularly, the present technology relates to systems, apparatus, and methods for automated trajectory prediction.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have sensors that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to determine a raster representative of a surrounding environment of a vehicle, wherein the raster depicts one or more objects in the surrounding environment of the vehicle. A plurality of trajectory proposals are determined for a first object of the one or more objects. For each trajectory proposal of the plurality of trajectory proposals, a score indicative of a likelihood that the first object will take a trajectory consistent with the trajectory proposal, and an offset for modifying the trajectory proposal are generated. A predicted trajectory is determined for the first object based on the scores and the offsets for the plurality of trajectory proposals.

In an embodiment, ground truth trajectory information for the first object is stored based on an actual trajectory traveled by the first object. The ground truth trajectory information is used to train a machine learning model In an embodiment, the determining the predicted trajectory for the first object based on the scores and the offsets comprises: selecting a first trajectory proposal of the plurality of trajectory proposals based on the scores, and modifying the first trajectory proposal with a first offset associated with the first trajectory proposal.

In an embodiment, each trajectory proposal of the plurality of trajectory proposals is represented by a vector comprising a plurality of position values, each position value is associated with a particular time, and the plurality of position values and the associated times define a potential trajectory.

In an embodiment, each offset comprises a plurality of offset values for modifying the plurality of position values in the trajectory proposal associated with the offset.

In an embodiment, each trajectory proposal of the plurality of trajectory proposals can be converted into a modified trajectory proposal by combining the trajectory proposal with its associated offset, and each modified trajectory proposal would result in a higher score output from the machine learning model than its associated trajectory proposal.

In an embodiment, the raster is a two-dimensional image.

In an embodiment, the raster further comprises semantic map information.

In an embodiment, the raster further comprises previous trajectory information for each object of the one or more objects.

In an embodiment, at least some of the plurality of trajectory proposals are automatically generated based on previous trajectory information for the first object.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 3B illustrates various example trajectory proposals, according to an embodiment of the present technology.

Figure 1:
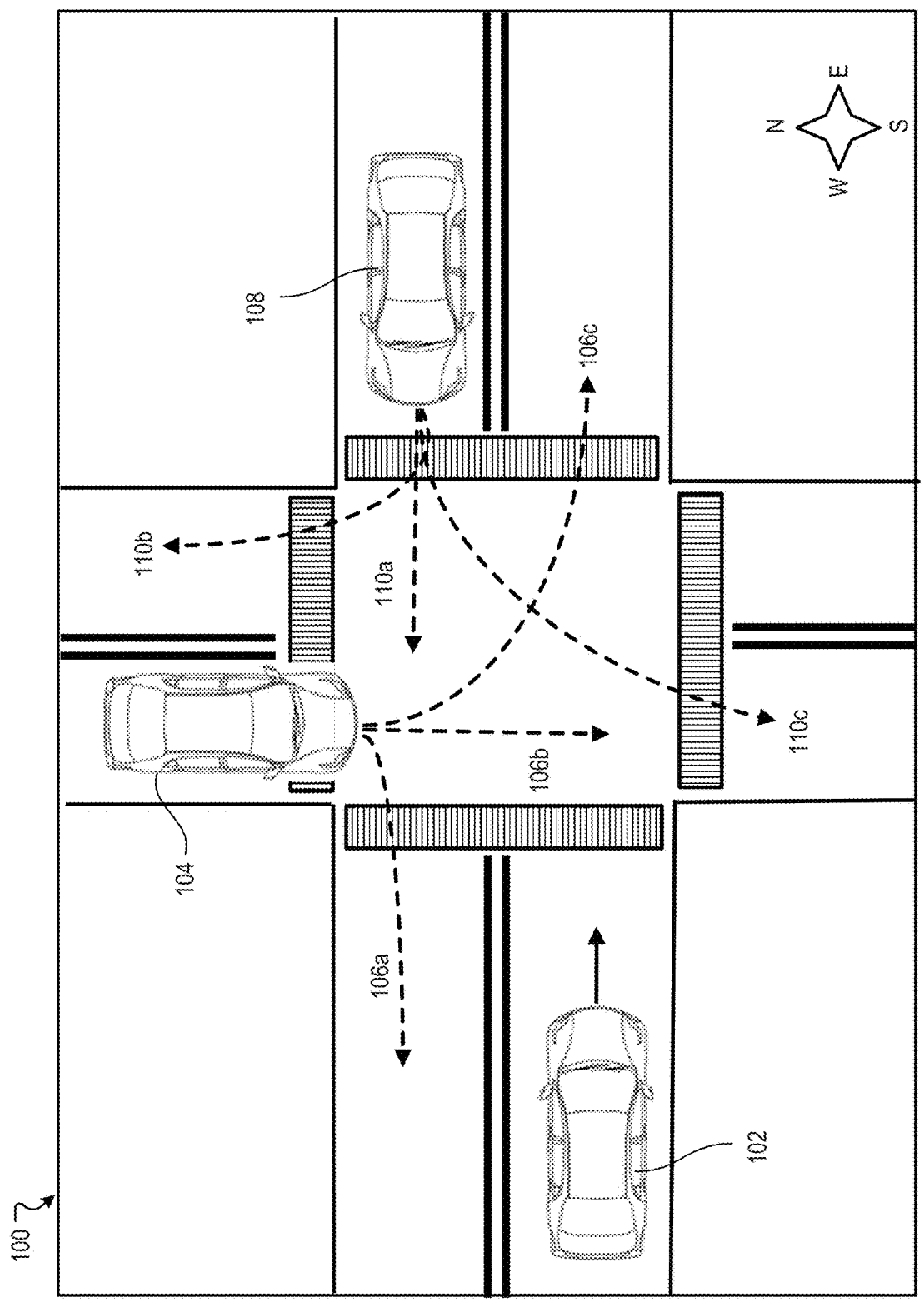
FIG. 1 illustrates an example scenario demonstrating various challenges that may be experienced in conventional approaches to automated vehicle navigation and trajectory prediction.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, a vehicle may have one or more sensors or sensor systems that can recognize hazards, roads, lane markings, traffic signals, etc. Data from sensors may be used to, for example, safely drive the vehicle, activate certain safety features (e.g., automatic braking), and generate alerts about potential hazards.

Predicting object trajectories is an important consideration for operating a vehicle autonomously or semi-autonomously. FIG. 1 illustrates an example scenario 100 illustrative of the importance of object trajectory prediction in autonomous vehicle operation. In the example scenario 100, a first vehicle 102 is traveling eastbound on a two-lane road and is approaching a four-way intersection. A second vehicle 104 is entering the intersection and traveling in a southbound direction. A third vehicle 108 is also approaching the intersection and traveling in a westbound direction. In order to control and navigate the vehicle 102 safely, an autonomous vehicle platform must be aware of objects in the surrounding environment of the vehicle 102, including the vehicles 104, 108. Furthermore, decisions made by the autonomous vehicle platform depend not only on the current positions of the vehicles 104, 108, but may also depend on the subsequent actions that will be taken by the vehicles 104, 108. For example, in the example scenario 100, the vehicle 102 intends to continue driving east through the intersection. If the vehicle 104 is making a right turn (arrow 106a), and the vehicle 108 continues straight (arrow 110a) or makes a right turn (arrow 110b), then the vehicle 102 can continue through the intersection without risk of collision with either of the other vehicles. However, if the vehicle 104 continues to head south through the intersection (arrow 106b) or makes a left turn at the intersection (arrow 106c), and/or the vehicle 108 makes a left turn at the intersection (arrow 110c), the vehicle 102 must slow down or come to a complete stop in order to avoid a collision. The trajectory of each vehicle 104, 108 is relevant to the trajectory that can be taken by the vehicle 102. As such, it is an important consideration for autonomous vehicles to be able to accurately and effectively predict the trajectories of objects in their surrounding environment. Conventional approaches pose disadvantages in addressing these and other challenges in autonomous vehicle navigation.

An improved approach in accordance with the present technology overcomes the foregoing and other disadvantages associated with conventional approaches. In various embodiments, the present technology can train a machine learning model to predict a most likely trajectory for each object in a vehicle's surrounding environment. In an embodiment, the machine learning model can be trained to determine (e.g., receive and/or generate) a raster (e.g., a two-dimensional image) representative of a vehicle's surrounding environment at a given point in time. The raster may depict one or more objects in the vehicle's surrounding environment at that point in time. The raster may also include and/or depict semantic map information pertaining to the vehicle's surrounding environment (also referred to herein as "semantic information"). The raster may be received by a perception system or may be generated based on the sensor information and the semantic map information associated with the vehicle. The raster may represent an advantageous manner in which to convey this information due to the fact that the raster can provide a large amount of information in a relatively compact manner and can provide the information in a format that machine learning models have been optimized to analyze and interpret (i.e., an image). The machine learning model can also be trained to determine (e.g., receive and/or generate) a plurality of trajectory proposals for an object. The object may be an object in the vehicle's surrounding environment and may be depicted in the raster. As mentioned above, a raster may be representative of a vehicle's surrounding environment at a particular point in time. The plurality of trajectory proposals may represent a plurality of possible trajectories that may be taken by the object in the moments immediately after the point in time depicted in the raster (e.g., in the next x seconds). The machine learning model can be configured to receive the raster and the plurality of trajectory proposals as inputs and to output, for each trajectory proposal, a score indicative of a likelihood that the object will take a trajectory consistent with the trajectory proposal. The machine learning model can also be configured to output, for each trajectory proposal, an offset for modifying the trajectory proposal. The offset for each trajectory proposal can be determined in such a way that modifying the trajectory proposal with the offset increases the likelihood that the object will take a trajectory consistent with the trajectory proposal. In an embodiment, a predicted trajectory can be determined for the object based on the scores and the offsets. In an embodiment, the predicted trajectory for the object may be determined by selecting the trajectory proposal having the highest score and modifying the trajectory proposal based on its associated offset. The present technology provides for a more efficient and more accurate way to predict the trajectory of an object by quickly generating many different trajectory proposals and analyzing the trajectory proposals rather than generating a single trajectory prediction. The disclosed technology may provide advantages, as machine learning models are generally more efficient at scoring and comparing a given set of trajectory proposals rather than trying to generate a single accurate trajectory prediction, which can be more resource-intensive and may often end up being less accurate. Furthermore, machine learning models may be more efficient at determining offsets for modifying (and improving the predicted accuracy of) an existing trajectory proposal rather than trying to identify a single accurate trajectory prediction. More details relating to the present technology are provided below.

Figure 2:
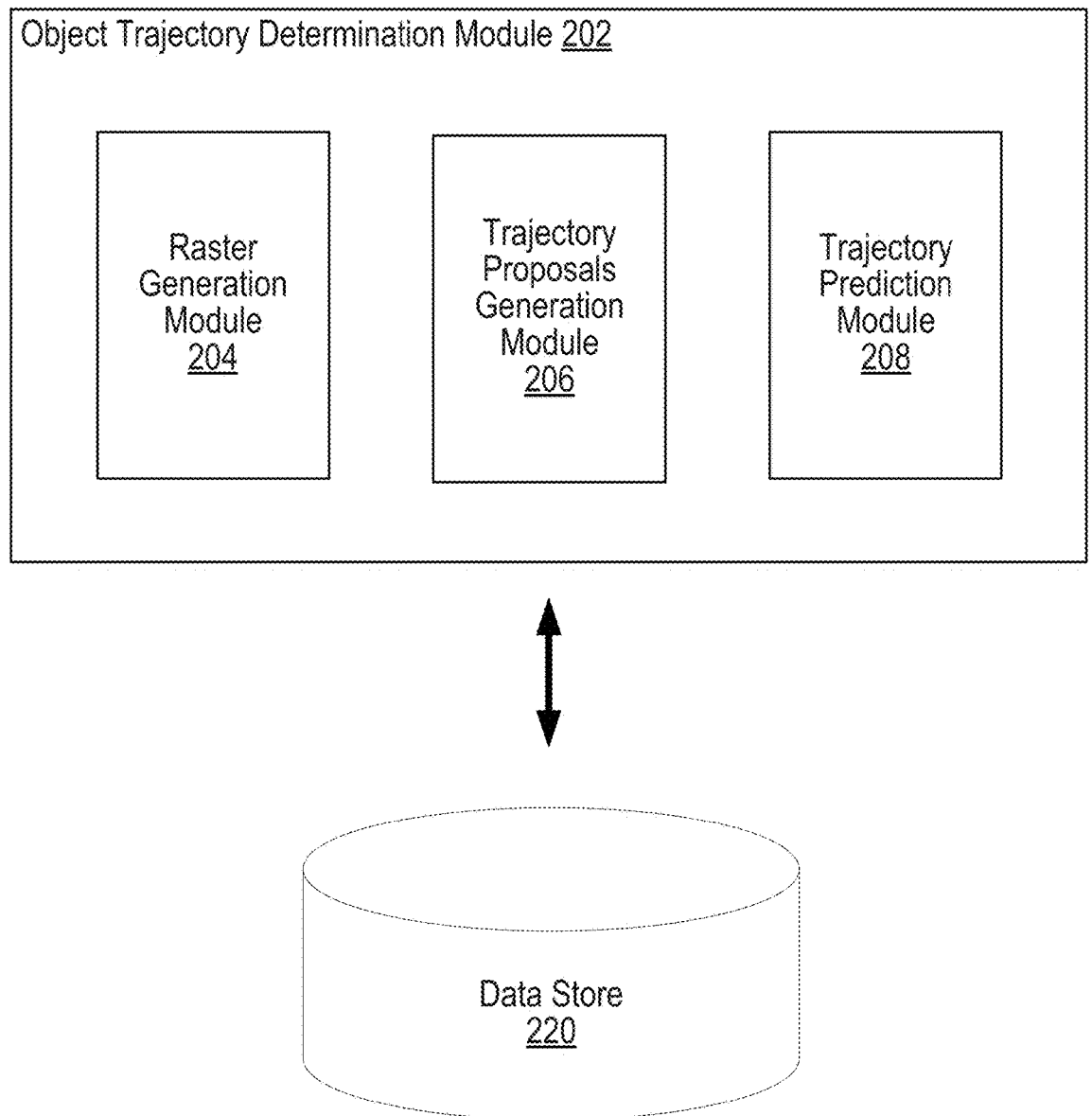
FIG. 2 illustrates an example object trajectory determination module, according to an embodiment of the present technology.

FIG. 2 illustrates an example environment 200 including an example object trajectory determination module 202, according to an embodiment of the present technology. As shown in the example of FIG. 2, the object trajectory determination module 202 can include a raster generation module 204, a trajectory proposals generation module 206, and a trajectory prediction module 208. In some instances, the example system 200 can include at least one data store 220. The object trajectory determination module 202 can be configured to communicate and operate with the at least one data store 220. The at least one data store 220 can be configured to store and maintain various types of data. In some embodiments, some or all of the functionality performed by the object trajectory determination module 202 and its sub-modules may be performed by one or more backend computing systems, such as a transportation management system 660 of FIG. 6. In some embodiments, some or all of the functionality performed by the object trajectory determination module 202 and its sub-modules may be performed by one or more computing systems implemented in a vehicle, such as a vehicle 640 of FIG. 6. In some embodiments, some or all data stored in the data store 220 can be stored by the transportation management system 660 of FIG. 6. In some embodiments, some or all data stored in the data store 220 can be stored by the vehicle 640 of FIG. 6. The components (e.g., modules, elements, etc.) shown in this figure and all figures herein are exemplary only, and other implementations may include additional, fewer, integrated, or different components. Some components may not be shown so as not to obscure relevant details.

Figure 3A:
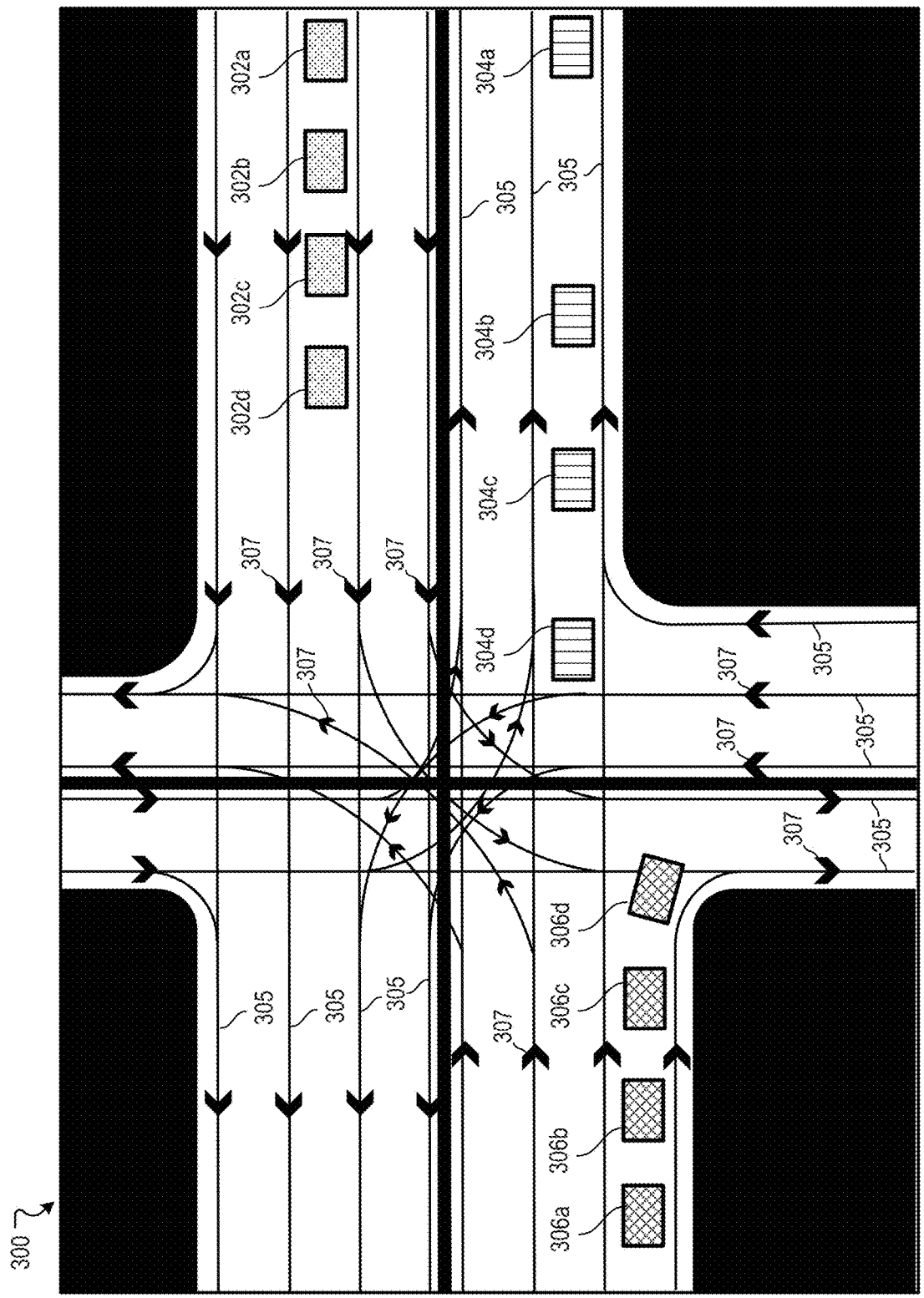
FIG. 3A illustrates an example raster, according to an embodiment of the present technology.

The raster generation module 204 can be configured to generate a raster representative of the surrounding environment of a vehicle at a particular point in time. In an embodiment, the raster may be a two-dimensional image representation of the vehicle's surrounding environment. FIG. 3A depicts an example raster 300, according to an embodiment of the present technology. The raster can include and/or depict one or more objects in the vehicle's surrounding environment. For example, the raster may include representations of vehicles, pedestrians, bicycles, or any other objects that may be in an immediate area surrounding the vehicle (e.g., within a threshold distance of the vehicle). In FIG. 3A, the example raster 300 depicts three objects: a vehicle 302 (represented by a rectangle filled with dots), a vehicle 304 (represented by a rectangle filled with vertical stripes), and a vehicle 306 (represented by a rectangle filled with crossing diagonal stripes). In addition to depicting objects in the vehicle's surrounding environment, the raster may also depict a previous path or trajectory that was traveled by each object in the moments leading up to the point in time represented by the raster. For example, the raster may depict, for each object depicted in the raster, the position of the object at various times during a period of time immediately preceding the point in time represented by the raster (e.g., the position of each object 3 seconds ago, 2 seconds ago, 1 second ago). In the example raster 300 shown in FIG. 3A, the previous trajectory traveled by each vehicle 302, 304, 306 is depicted. For example, the previous trajectory of the vehicle 302 is depicted by boxes 302a-d, where box 302a represents the position of the vehicle 302 three seconds ago, box 302b represents the position of the vehicle 302 two seconds ago, box 302c represents the position of the vehicle 302 one second ago, and box 302d represents the position of the vehicle 302 now (i.e., at the point in time represented by the raster 300). Similarly, the previous trajectory of the vehicle 304 is depicted by the sequence of boxes 304a-d, and the previous trajectory of the vehicle 306 is depicted by the sequence of boxes 306a-d. While the positions of the vehicles are depicted at one second intervals, any other suitable time intervals also can be used.

The raster may also include semantic map information pertaining to the immediate area surrounding the vehicle. Semantic map information may include lane information (including lane boundaries and lane directions), locations of stop signs, crosswalks, traffic signals, yield signs, and any other semantic information that may be useful for operating an autonomous vehicle. In the example raster 300 shown in FIG. 3A, the raster 300 includes lane boundary information (e.g., lane markers 305) and lane direction information (e.g., lane direction arrows 307). While the semantic map information shown in the raster 300 includes only two types of semantic information, it should be understood that this is for clarity of explanation, and much more detailed and complex semantic map information may be represented in a raster.

The raster may be generated in such a way that different types of information (e.g., different objects, different types of objects, different types of semantic information) can be identified and distinguished based on the visual information depicted in the raster. For example, the raster can utilize different colors, different shapes, different sizes or widths, different fill patterns, text, and the like to distinguish between different types of information. In the example raster 300, different objects (e.g., different vehicles) are distinguished using different fill patterns, lane boundaries are indicated using thin solid lines, lane directions are indicated using arrows on the lane boundary lines, and median lines are indicated using thicker lines. In general, the raster can include sufficient visual information for a machine learning model (e.g., a neural network) to be able to gather relevant information pertaining to and describing the surrounding environment of a vehicle.

The trajectory proposals generation module 206 can be configured to generate a plurality of trajectory proposals for a particular object in the surrounding environment of a vehicle. In various embodiments, a plurality of trajectory proposals may be generated for each object or a subset of objects depicted in a raster. Each trajectory proposal associated with an object may represent a potential trajectory that may be taken by the object in an immediately upcoming period of time. As mentioned above, a raster may depict a representation of the surrounding environment of a vehicle at a particular point in time, including objects in the environment. A trajectory proposal may represent, for a particular object depicted in a raster, a potential trajectory that may be taken by the object in a period of time immediately following the particular point in time represented by the raster (e.g., in the next x seconds). In an embodiment, one or more trajectory proposals may be generated for an object based on a previous trajectory of the object (which, as described above, may be depicted in a raster). In an embodiment, one or more trajectory proposals for an object may be generated based on semantic map information contained in a raster. FIG. 3B illustrates three different trajectory proposals for the vehicle 302 of FIG. 3A. As mentioned above, the raster 300 of FIG. 3A depicts a previous trajectory for the vehicle 302 (depicted by boxes 302a-d) and also includes semantic map information. Each of the three trajectory proposals shown in FIG. 3B are generated based on the previous trajectory of the vehicle 302 and also based on semantic map information contained in the raster 300. A first trajectory proposal (trajectory proposal 1) has the vehicle 302 continuing on its previous trajectory (e.g., going straight in the same lane at a constant speed). A second trajectory proposal (trajectory proposal 2) has the vehicle 302 changing to a right lane, and making a right turn. This trajectory proposal is generated based on the current position of the vehicle 302 (represented by box 302d), as well as lane boundary and lane direction information in the raster 300. Similarly, the third trajectory proposal (trajectory proposal 3) has the vehicle 302 changing to a left lane and making a left turn. Once again, this trajectory proposal is generated based on the current position of the vehicle 302 and lane boundary and lane direction information in the raster 300.

While the trajectory proposals are visually depicted in FIG. 3B, in an embodiment, each trajectory proposal may be represented as a vector of position values (e.g., a vector of coordinates). For example, if each position within a raster can be represented as an x- and y-coordinate pair, a trajectory proposal may comprise a plurality of coordinate pairs that indicate the possible position of an object within the raster at various points in time. For example, in the example shown in FIG. 3B, if the east/west direction is used as the x-axis, and the north/south direction is used as the y-axis, the first trajectory proposal (trajectory proposal 1) may be represented by the following vector: [(x1, y1); (x2, y2); (x3, y3); (x4, y4)]. Each position in the vector may represent a particular point in time. For example, the first position in the vector may represent a first time (e.g., the vehicle 302 will be at position (x1, y1) in one second from now), the second position in the vector may represent a second time (e.g., the vehicle 302 will be at position (x2, y2) in two seconds from now), the third position in the vector may represent a third time (e.g., the vehicle 302 will be at position (x3, y3) in three seconds from now), and so forth.

In various embodiments, the trajectory proposals generation module 306 can be configured to automatically generate trajectory proposals based on a raster, based on object information (e.g., previous object trajectory information, including object position information, object heading information, object velocity information, and/or object acceleration information), based on semantic information (e.g., lane boundaries, traffic signs, cross walks, stop signs, traffic lights, etc.), and the like. In an embodiment, the trajectory proposals generation module 306 can generate trajectory proposals based on a machine learning model. In an embodiment, the trajectory proposals generation module 306 can generate trajectory proposals based on a set of rules. For example, a rule may indicate that a trajectory proposal should be generated which has an object continuing its previous trajectory. Although FIG. 3B depicts only three example trajectory proposals for an object, it should be understood that any number of trajectory proposals (e.g., tens, hundreds, thousands) can be generated for each object.

Returning to FIG. 2, the trajectory prediction module 208 can be configured to determine a predicted trajectory for an object based on a machine learning model. In an embodiment, the machine learning model may be a neural network. In a more particular embodiment, the machine learning model may be a convolutional neural network. In an even more particular embodiment, the machine learning model may be a type of convolutional neural network known as a trajectory proposal network. As discussed above, for a given point in time, a raster may be generated (e.g., by the raster generation module 204) which represents the surrounding environment of a vehicle (e.g., an area within a threshold distance of the vehicle). Furthermore, for a particular object depicted in the raster (or for each object depicted in the raster), a plurality of trajectory proposals may be generated (e.g., by the trajectory proposals generation module 206). The machine learning model can be configured to receive the raster and the plurality of trajectory proposals associated with a particular object (i.e., the target object for which a trajectory is being predicted). The machine learning model can be configured to generate, for each trajectory proposal, a score indicative of the likelihood that the object will take a trajectory consistent with the trajectory proposal. As discussed above, a trajectory proposal may take the form of a vector, and the vector may comprise a plurality of position values (e.g., a plurality of positional coordinates) representative of a particular geographic position. Each position value may be associated with a particular point in time, such that the trajectory proposal comprises a plurality of (time, position) pairs which define a potential trajectory for the object (e.g., the object will be at position a at time x, the object will be a position b at time y, the object twill be at position c at time z, etc.). The score assigned to a trajectory proposal may be indicative of a likelihood that the object will take a trajectory that is within a threshold time and/or a threshold distance of the trajectory proposal. By assigning scores to each trajectory proposal, the trajectory proposals can be ranked based on score, and a "most likely" trajectory can be determined based on the scores (e.g., a trajectory proposal having the highest score).

The machine learning model may also be configured to generate, for each trajectory proposal, an offset. The offset may take the form of a vector of the same dimensions as the trajectory proposals, and may comprise a plurality of offset values. An offset generated for and/or associated with a trajectory proposal may comprise a set of offset values for modifying the trajectory proposal in such a way as to increase the score of the trajectory proposal as determined by the machine learning model. In other words, the offset for a trajectory proposal may be a modification to the trajectory proposal to increase the likelihood of the trajectory proposal being the correct trajectory that is taken by the object.

Figure 4A:
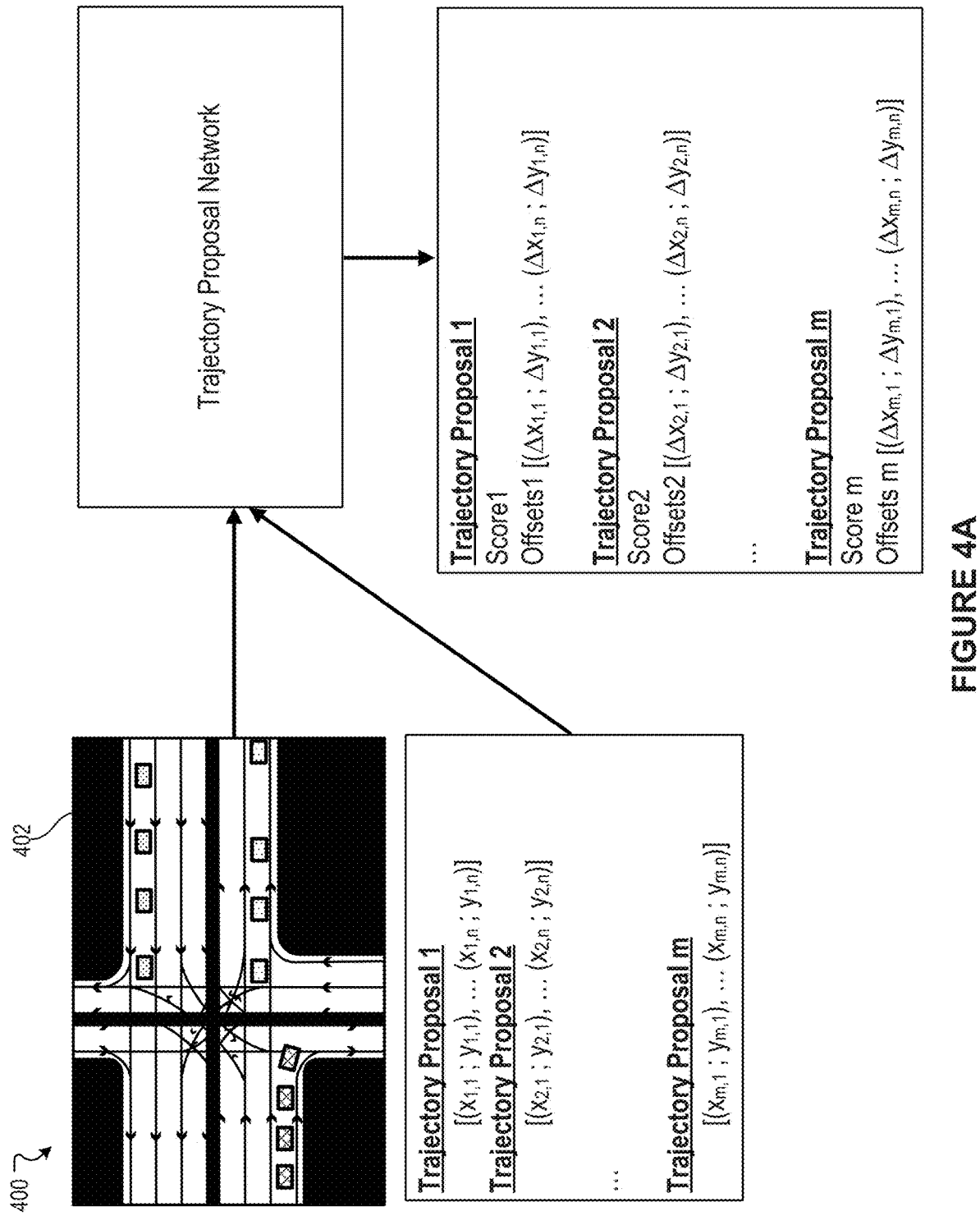
FIG. 4A illustrates an example flow diagram for trajectory prediction, according to an embodiment of the present technology.

FIG. 4A depicts an example scenario 400 which illustrates various aspects of the present technology. In the example scenario 400, a raster 402 depicts one or more objects in the surrounding environment of a vehicle as well as semantic information for the surrounding environment of the vehicle. A plurality of trajectory proposals 1-m are generated for a particular object of the one or more objects depicted in the raster 402. The raster 402 and the plurality of trajectory proposals are provided as inputs to a trajectory proposal network (e.g., a region proposal network or region-based convolutional neural network, such as [Fast] R-CNN). The trajectory proposal network outputs, for each trajectory proposal, a score and an offset. The offset for a trajectory proposal represents a modification to the trajectory proposal that the trajectory proposal network has determined would increase the likelihood that the object will take a trajectory consistent with the trajectory proposal. For example, if a trajectory proposal was modified using the offset associated with the trajectory proposal, and the modified trajectory proposal was provided to the trajectory proposal network, the modified trajectory proposal would result in a higher score by the trajectory proposal network than the original trajectory proposal. By configuring a machine learning model in this manner, the trajectory proposals generation module 206 does not have to predict a perfectly accurate trajectory proposal or an inordinately large number of trajectory proposals in order for the ultimate trajectory prediction to be accurate. In fact, the trajectory proposals generation module 206 may be able to generate a relatively modest number of trajectory proposals, none of which are, on their own, a particularly accurate trajectory prediction, but the ultimate outcome may still be a very accurate trajectory prediction because offsets are calculated for the trajectory proposals which improve their accuracy.

The trajectory prediction module 208 can determine a predicted trajectory for an object based on the scores and the offsets. In an embodiment, the trajectory prediction module 208 can determine a predicted trajectory for an object by selecting a trajectory proposal that had the highest score (i.e., was determined to have the highest likelihood of being the correct trajectory), and then modifying the trajectory proposal using its associated offset. For example, in the example scenario shown in FIG. 4A, consider an example scenario in which Trajectory Proposal 1 resulted in the highest score. Trajectory Proposal 1 is a vector $[(x_{1,1}; y_{1,1}), \ldots (x_{1,n}; y_{1,n})]$, and has an associated offset $[(\Delta x_{1,1}; \Delta y_{1,1}), \ldots (\Delta x_{1,n}; \Delta y_{1,n})]$. The predicted trajectory for the target object associated with the plurality of trajectory proposals 1-m may be determined by modifying trajectory proposal 1 with its associated offset such that the predicted trajectory is represented by the vector $[(x_{1,1}+\Delta x_{1,1}; y_{1,1}+\Delta y_{1,1}), \ldots (x_{1,n}+\Delta x_{1,n}; y_{1,n}+\Delta y_{1,n})]$.

A raster may depict multiple objects. The raster generation, the trajectory proposal generation, and/or the trajectory prediction functions described above can be performed in multiple iterations to determine a predicted trajectory for each object depicted in the raster. In other words, a plurality of trajectory proposals can be generated for each object, and then provided to the trajectory proposal network. The resultant scores and offsets can then be used to determine a predicted trajectory for each object depicted in the raster. Once predicted trajectories are determined for one or more objects in a vehicle's surrounding environment, a trajectory can be determined for the vehicle based on the predicted trajectories of the objects surrounding the vehicle (e.g., to avoid collisions or other unwanted interactions with objects in the vehicle's surrounding environment). Navigation and/or operation of an autonomous vehicle can be controlled so that navigation of the autonomous vehicle follows the trajectory determined for the vehicle.

Figure 4B:
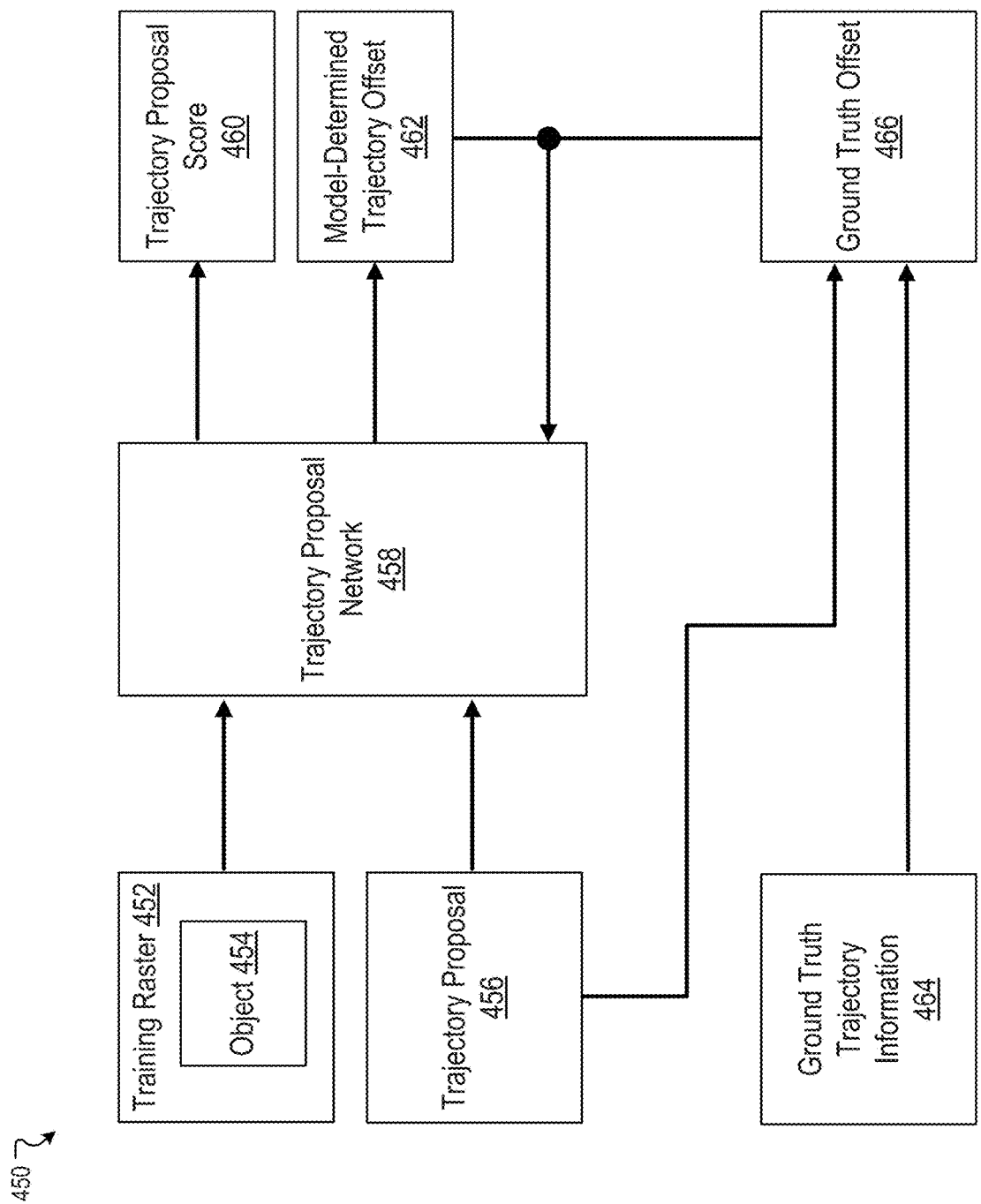
FIG. 4B illustrates an example scenario associated with training a trajectory proposal network, according to an embodiment of the present technology.

In an embodiment, the machine learning model (e.g., the trajectory proposal network), can be trained using a set of training data. FIG. 4B illustrates an example scenario 450 which demonstrates sample training of a trajectory proposal network 458. The set of training data may include a plurality of rasters, each raster depicting one or more objects, and actual, ground truth trajectory information for the one or more objects depicted in the plurality of rasters. The machine learning model (the trajectory proposal network 458), which may be a neural network, can initially be weighted with random or assigned weights. In each training instance, the machine learning model can be provided with a raster (training raster 452) and a trajectory proposal (trajectory proposal 456) for a target object (object 454) depicted in the raster. The machine learning model will output a score for the trajectory proposal (trajectory proposal score 460) as well as an offset for the trajectory proposal (model-determined trajectory offset 462). Actual, ground truth trajectory information for the target object 454 is known (ground truth trajectory information 464). As such, the actual ground truth offset 466 (comprising a plurality of ground truth offset values) can be calculated for the trajectory proposal 456 (i.e., the offset to modify the trajectory proposal 456 to match the actual trajectory 464 taken by the target object 454). These ground truth offset values can be provided as back-propagation values (in certain embodiments, along with the model-determined trajectory offset values 460) for training the machine learning model (trajectory proposal network 458). This can be performed iteratively over many training instances in order to train the machine learning model to output accurate scores and accurate offsets.

Figure 5:
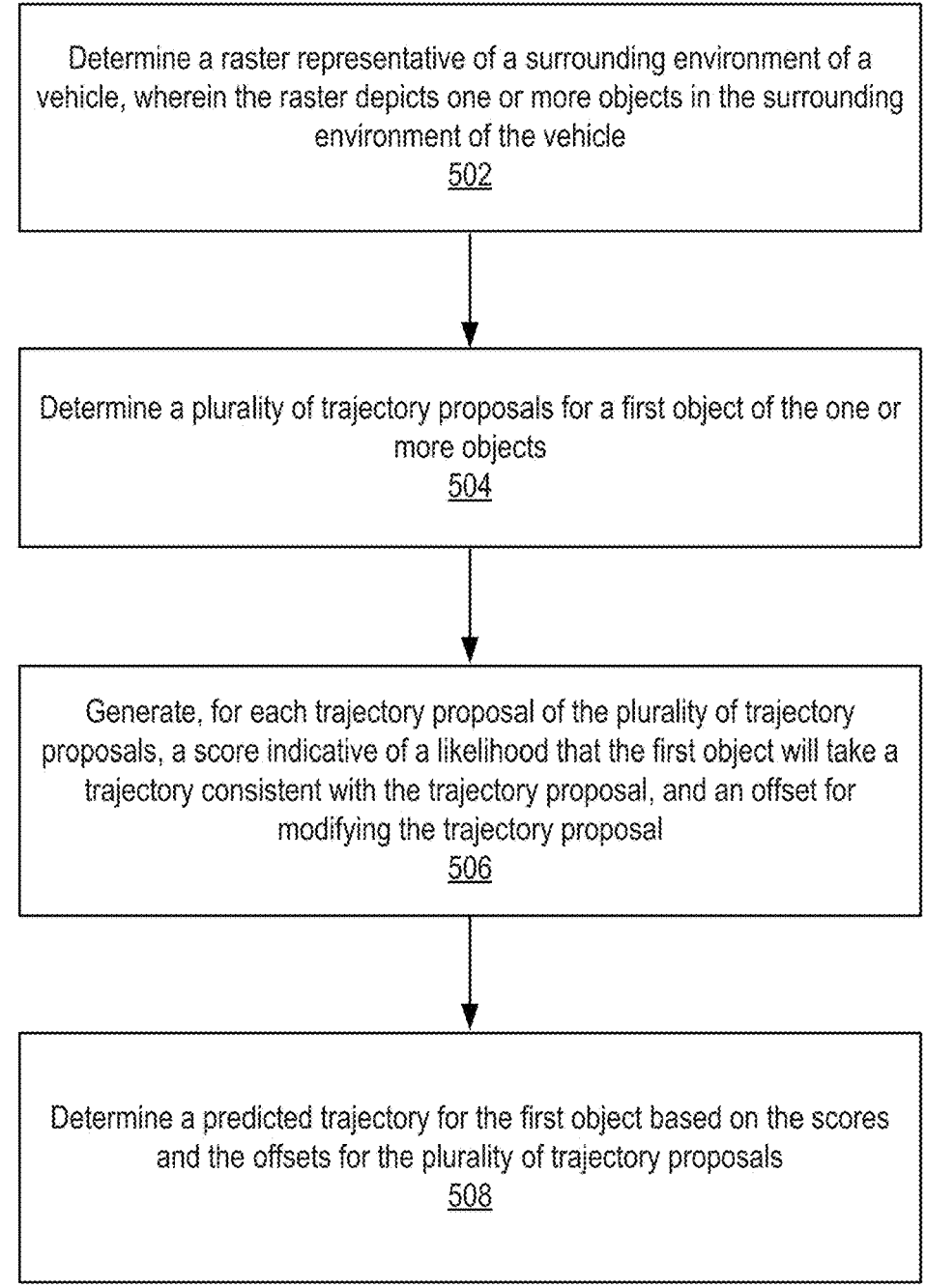
FIG. 5 illustrates an example method, according to an embodiment of the present technology.

FIG. 5 illustrates an example method 500, according to an embodiment of the present technology. At block 502, the example method 500 can determine a raster representative of a surrounding environment of a vehicle, wherein the raster depicts one or more objects in the surrounding environment of the vehicle. At block 504, the example method 500 can determine a plurality of trajectory proposals for a first object of the one or more objects. At block 506, the example method 500 can generate, for each trajectory proposal of the plurality of trajectory proposals, a score indicative of a likelihood that the first object will take a trajectory consistent with the trajectory proposal, and an offset for modifying the trajectory proposal. At block 508, the example method 500 can determine a predicted trajectory for the first object based on the scores and the offsets for the plurality of trajectory proposals.

Many variations to the example method are possible. It should be appreciated that there can be additional, fewer, or alternative steps performed in similar or alternative orders, or in parallel, within the scope of the various embodiments discussed herein unless otherwise stated.

Figure 6:
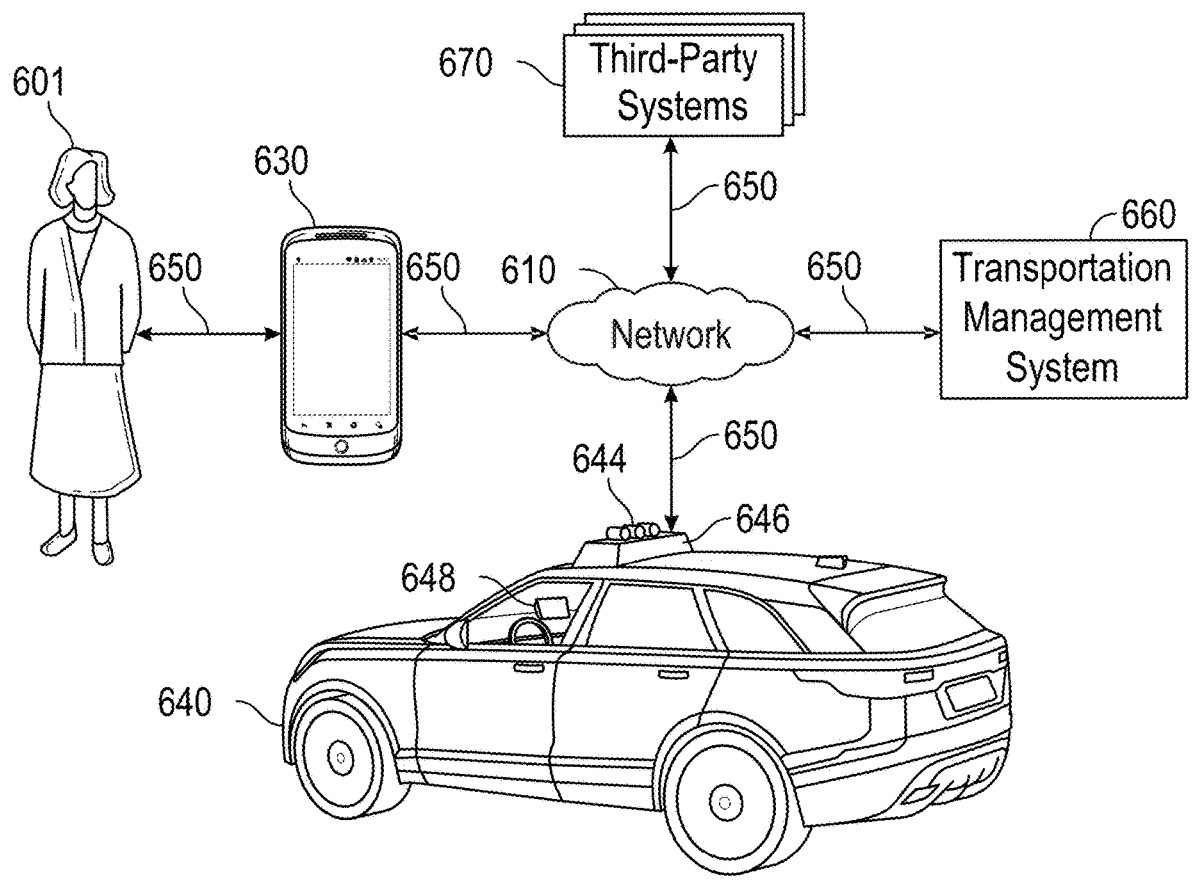
FIG. 6 illustrates an example block diagram of a transportation management environment, according to an embodiment of the present technology.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the object trajectory determination module 202 may be implemented by one or more computing systems of the transportation management system 660. In some embodiments, some or all modules of the object trajectory determination module 202 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
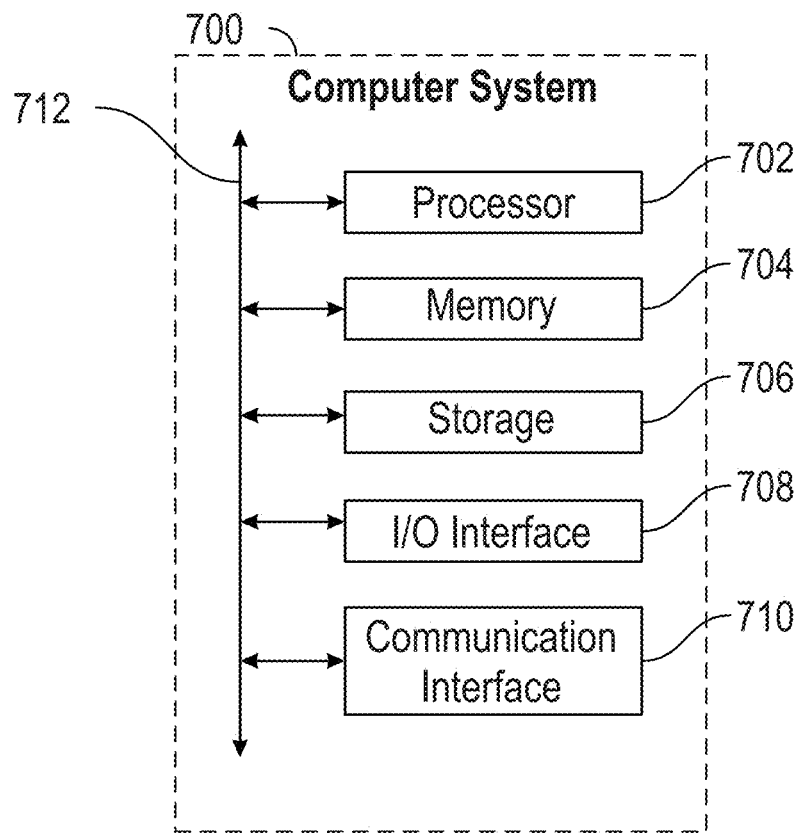
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate.

One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   determining, by a computing system, a raster representative of a surrounding environment of a vehicle, wherein the raster includes visual information that depicts one or more objects in the surrounding environment of the vehicle;
   determining, by the computing system, a model based on the visual information included in the raster;
   determining, by the computing system, a plurality of trajectory proposals for a first object of the one or more objects using the model;
   generating, by the computing system, for each trajectory proposal of the plurality of trajectory proposals;
      a respective score indicative of a likelihood that the first object will take a trajectory consistent with the trajectory proposal, and
      a respective offset for modifying the trajectory proposal that increases the likelihood that the first object will take the trajectory consistent with the modified trajectory proposal; and
   determining, by the computing system, a predicted trajectory for the first object based on the respective scores and the respective offsets for each trajectory proposal of the plurality of trajectory proposals.

2. The computer-implemented method of claim 1, further comprising:
   storing ground truth trajectory information for the first object based on an actual trajectory traveled by the first object, wherein the ground truth trajectory information is used to train a machine learning model.

3. The computer-implemented method of claim 1, wherein the determining the predicted trajectory for the first object based on the respective scores and the respective offsets for each trajectory proposal comprises:
   selecting a first trajectory proposal of the plurality of trajectory proposals based on the respective score for each trajectory proposal, and
   modifying the first trajectory proposal with a first offset associated with the first trajectory proposal.

4. The computer-implemented method of claim 1, wherein each trajectory proposal of the plurality of trajectory proposals is represented by a vector comprising a plurality of position values, each position value is associated with a particular time, and the plurality of position values and the associated times define a potential trajectory.

5. The computer-implemented method of claim 4, wherein each offset comprises a plurality of offset values for modifying the plurality of position values in the trajectory proposal associated with the offset.

6. The computer-implemented method of claim 5, wherein each trajectory proposal of the plurality of trajectory proposals can be converted into a modified trajectory proposal by combining the trajectory proposal with its associated offset, and each modified trajectory proposal would result in a higher score output from a machine learning model than its associated trajectory proposal.

7. The computer-implemented method of claim 1, wherein the raster is a two-dimensional image.

8. The computer-implemented method of claim 1, wherein the raster further comprises semantic map information.

9. The computer-implemented method of claim 1, wherein the raster further comprises previous trajectory information for each object of the one or more objects.

10. The computer-implemented method of claim 9, wherein at least some of the plurality of trajectory proposals are automatically generated based on previous trajectory information for the first object.

11. A system comprising:
   at least one processor; and
   a memory storing instructions that, when executed by the at least one processor, cause the system to perform:
      determining a raster representative of a surrounding environment of a vehicle, wherein the raster includes visual information that depicts one or more objects in the surrounding environment of the vehicle;
      determining a model based on the visual information included in the raster;
      determining a plurality of trajectory proposals for a first object of the one or more objects using the model;
      generating, for each trajectory proposal of the plurality of trajectory proposals;
         a respective score indicative of a likelihood that the first object will take a trajectory consistent with the trajectory proposal, and
         a respective offset for modifying the trajectory proposal that increases the likelihood that the first object will take the trajectory consistent with the modified trajectory proposal; and
      determining a predicted trajectory for the first object based on the respective scores and the respective offsets for each trajectory proposal of the plurality of trajectory proposals.

12. The system of claim 11, wherein the instructions, when executed by the at least one processor, further cause the system to perform:
   storing ground truth trajectory information for the first object based on an actual trajectory traveled by the first object, wherein the ground truth trajectory information is used to train a machine learning model.

13. The system of claim 11, wherein the determining the predicted trajectory for the first object based on the respective scores and the respective offsets for each trajectory proposal comprises:
   selecting a first trajectory proposal of the plurality of trajectory proposals based on the respective score for each trajectory proposal, and
   modifying the first trajectory proposal with a first offset associated with the first trajectory proposal.

14. The system of claim 11, wherein each trajectory proposal of the plurality of trajectory proposals is represented by a vector comprising a plurality of position values, each position value is associated with a particular time, and the plurality of position values and the associated times define a potential trajectory.

15. The system of claim 14, wherein each offset comprises a plurality of offset values for modifying the plurality of position values in the trajectory proposal associated with the offset.

16. A non-transitory computer-readable storage medium including instructions that, when executed by at least one processor of a computing system, cause the computing system to perform a method comprising:
   determining a raster representative of a surrounding environment of a vehicle, wherein the raster includes visual information that depicts one or more objects in the surrounding environment of the vehicle;
   determining a model based on the visual information included in the raster;
   determining a plurality of trajectory proposals for a first object of the one or more objects using the model;
   generating, for each trajectory proposal of the plurality of trajectory proposals;

a respective score indicative of a likelihood that the first object will take a trajectory consistent with the trajectory proposal, and a respective offset for modifying the trajectory proposal that increases the likelihood that the first object will take the trajectory consistent with the modified trajectory proposal; and determining a predicted trajectory for the first object based on the respective scores and the respective offsets for each trajectory proposal of the plurality of trajectory proposals.

17. The non-transitory computer-readable storage medium of claim 16, wherein the instructions, when executed by the at least one processor of the computing system, further cause the computing system to perform:

storing ground truth trajectory information for the first object based on an actual trajectory traveled by the first object, wherein the ground truth trajectory information is used to train a machine learning model.

18. The non-transitory computer-readable storage medium of claim 16, wherein the determining the predicted trajectory for the first object based on the respective scores and the respective offsets for each trajectory proposal comprises:

selecting a first trajectory proposal of the plurality of trajectory proposals based on the respective score for each trajectory proposal, and modifying the first trajectory proposal with a first offset associated with the first trajectory proposal.

19. The non-transitory computer-readable storage medium of claim 16, wherein each trajectory proposal of the plurality of trajectory proposals is represented by a vector comprising a plurality of position values, each position value is associated with a particular time, and the plurality of position values and the associated times define a potential trajectory.

20. The non-transitory computer-readable storage medium of claim 19, wherein each offset comprises a plurality of offset values for modifying the plurality of position values in the trajectory proposal associated with the offset.

* * * * *